United States Patent [19]

Sakakibara et al.

[11] Patent Number: 4,709,793

[45] Date of Patent: Dec. 1, 1987

[54] PARKING MECHANISM FOR TRANSMISSIONS

[75] Inventors: Shiro Sakakibara; Kazuhisa Ozaki, both of Anjo, Japan

[73] Assignee: Aisin-Warner Limited, Japan

[21] Appl. No.: 703,676

[22] Filed: Feb. 20, 1985

[30] Foreign Application Priority Data

Feb. 22, 1984 [JP] Japan ................................. 59-31853

[51] Int. Cl.[4] ........................ B60K 41/26; B60K 20/02
[52] U.S. Cl. .................................. 192/4 A; 192/4 C; 74/473 R
[58] Field of Search .............. 192/4 A, 4 C; 74/473 R

[56] References Cited

U.S. PATENT DOCUMENTS

| 1,923,995 | 8/1933 | Nock | 192/4 C |
|---|---|---|---|
| 2,839,941 | 6/1958 | Rugen | 192/4 A |
| 2,963,945 | 12/1960 | Barker et al. | 192/4 C |
| 3,631,950 | 1/1972 | Tanaka | 192/4 A |
| 3,651,904 | 3/1972 | Snoy et al. | 192/4 A |
| 3,994,374 | 11/1976 | Gill | 192/4 A |
| 4,324,152 | 4/1982 | Oshima et al. | 74/473 R X |
| 4,473,142 | 9/1984 | Makishima | 74/473 R X |
| 4,483,210 | 11/1984 | Mayuzumi | 74/473 R X |
| 4,527,442 | 7/1985 | Hoffmann et al. | 192/4 C X |
| 4,543,845 | 10/1985 | Sabel | 74/473 R X |
| 4,572,018 | 2/1986 | Hausinger | 74/473 R X |

FOREIGN PATENT DOCUMENTS

| 622214 | 11/1935 | Fed. Rep. of Germany | 192/4 C |
|---|---|---|---|
| 229055 | 2/1925 | United Kingdom | 192/4 C |

Primary Examiner—Leslie Braun
Assistant Examiner—Martin G. Belisario
Attorney, Agent, or Firm—Lorusso & Loud

[57] ABSTRACT

A parking mechanism for a transmission, comprising: a coupling member engageable simultaneously with two gears for different gear positions of the transmission when a change device provided besides a driver's seat is set in a "parking" position.

8 Claims, 17 Drawing Figures

PARKING MECHANISM FOR TRANSMISSIONS

BACKGROUND OF THE INVENTION (i) Field of the Invention

This invention relates to a manual parking mechanism for vehicles with a transmission.

(ii) DESCRIPTION OF THE PRIOR ART

Heretofore, it has been the general practice for a parking mechanism of a vehicle with, for example, a transmission gear system to produce the parking brake force at the time of parking by means of a parking brake device. However, the parking brake is normally used when the engine is off or when parking a vehicle, that is to say, under circumstances where it is difficult to use a booster which is operated by the intake manifold vacuum of the engine or compressed air, so that the braking force has to be applied solely by the hand or foot of a driver although it is relatively weak. In addition, the application of the braking force relies on the tactility of a hand on a brake lever or of a foot on a brake pedal, so that it is not always secure enough. Therefore, as an auxiliary means of the parking brake, the transmission gears are put in a certain gear position at the time of parking a vehicle in engine-off state, thereby engaging the clutch to hold the engine and transmission in directly coupled state and utilizing as parking brake the frictional restraint force of the engine against rotation of the crank shaft. Nevertheless, this frictional restraint force is not strong enough for securely parking a vehicle on steep slopes exceeding a certain gradient.

Therefore, a strong parking brake is required in order to park a vehicle securely. As one method for attaining this, it is known in the art to provide a parking mechanism incorporating into the transmission gear system a parking gear to be used exclusive for the parking purpose, securely locking the output shaft by meshing the parking gear with a lock pole which is fixed on the transmission case. However, the addition of the parking gear and the associated parts invites an increase in cost and makes the parking mechanism complicate.

Illustrated in FIGS. 1 to 3 is a conventional change gear mechanism incorporated into a transmission gear system without a parking mechanism.

Referring to FIG. 1, the transmission gear system which is designated at 100 has first-, second-, third- and fourth-speed drive gears 113 to 116 integrally mounted on an input shaft 112 which is supported in a transmission case 130 by bearings 110 and 111. Rotatably fitted on an output shaft 120, which is supported by bearings 120A and 121A in parallel relation with the input shaft 112, are first-, second-, third-and fourth-speed driven gears 121 to 124 which are constantly meshed with the drive gears 113 to 116, respectively. A couple of adjacent driven gears 121 and 122 are selectively coupled with the output shaft 120 by a first/second speed dog clutch 125 of a known construction including a sleeve 125a, a key 125b, a synchronizer ring 125c, a gear spline 125d and a clutch hub 125e. Similarly, the drive gears 115 and 116 are selectively coupled with the input shaft 112 by a third/fourth speed dog clutch 117 of a known construction including a sleeve 117a, a key 117b, a synchronizer ring 117c, a gear spline 117d and a clutch hub 117e. The transmission gear system is further provided with a driven gear 128 for meshing engagement with a reverse drive gear 118. In this instance, when the first-/second speed dog clutch 125 is engaged with the gear 121 by a gear shift mechanism to couple same with the output shaft 120, the rotation of the input shaft 112 is transmitted to the output shaft 120 after a largest speed reduction through gears 113 and 121 to establish the first speed. Similarly, the second speed is obtained by engaging the dog clutch 125 with the driven gear 122, and the third or fourth speed is obtained by engaging the third/fourth speed dog clutch 117 in the grooves of the gear 115 or 116, respectively. The reverse range is established by operation of the reverse gear mechanism 127.

The output shaft 120 has an output gear 129 in meshed engagement with a ring gear 230 of a differential unit 221 in a differential mechanism, thereby transmitting the power of the output shaft 120 from the ring gear 230 to a side gear 234 through a case 231, a pinion shaft 232 and a pinion 233 and then to a drive wheel through an axle 235. Further, as shown in FIGS. 2 and 3: a selector 303; a select and shifter shaft 304 having a shifter cable connecting portion 349 and a select cable connecting portion 342; shift inner lever 305 fixed to the select and shifter shaft 304; and a shifter arm 306 having a groove 361A for a first or second speed shifter arm 361, a groove 362A for a third or fourth speed shifter arm 362 and a groove for a reverse shifter arm 363 respectively engageable with shift inner lever 305, a first or second speed shifter rail 364 mounting thereon a first or second speed shifter fork 365 for operating the first/second speed dog clutch 125 and the first or second speed shifter arm 361, a third or fourth speed shifter rail 366 mounting thereon a third or fourth speed shifter fork 367 for operating the third/fourth speed dog clutch 117 and the third or fourth speed shifter arm 362, and a reverse shifter rail 368 mounting thereon a reverse shifter fork 369 for operating an idler gear (not shown) of a reverse gear mechanism 127 and the reverse shifter arm 363. Especially, in this type of transmission gear system with a fluid type torque converter, a fluid coupling or an electromagnetic clutch, it is necessary to provide a parking mechanism in association with the transmission gear system thereby to couple the engine and the transmission gears in engine-off state for safety purposes, through a select and shifter mechanism. An example of this type of transmission gear system is disclosed in Japanese patent application Laid Open No. 198150/1982, in which is additionally provided a gear mechanism only for parking use.

SUMMARY OF TH INVENTION

It is an object of the present invention to provide a parking mechanism for a transmission gear system, which is capable of securely parking a vehicle and adapted to lock the output shaft of the transmission simply by simultaneously engaging two sets of shift gears of the transmission, without requiring provision of an additional gear exclusively for the parking purpose.

The parking mechanism according to the invention is basically constituted by a change device provided beside a driver's seat and a gear engaging means which is arranged to engage two sets of shift gears of different speed ranges simultaneously when the change device is set in a parking position. According to a preferred form of the invention, there is provided a parking mechanism for a transmission gear system including: an input shaft of the transmission; an output shaft located parallel or coaxially with the input shaft; a select and shifter shaft mounted parallel with the input and output shafts slidably in the axial direction and driven in association with a change device provided besides a driver's seat; engaging means connected to the select and shifter shaft and provided with coupling members for a predetermined number of forward speed positions, a coupling member for a reverse position and a coupling member for a parking position; and a shifter rail slidable in the axial direction in parallel relation with the select and shifter shaft and provided with a plural number of gears to be engaged selectively with the coupling members of the engaging means to establish a desired gear position; characterized in that the coupling member for the parking position is adapted to engage simultaneously with a plural number of gears when the changer is set in a "parking" position.

According to another aspect of the present invention, there is also provided a parking mechanism for a transmission including an input shaft, an output shaft located in parallel or coaxial relation with the input shaft, a dog clutch rotatable and slidable in the axial direction parallel with the input and output shafts and driven in relation with operation of a change device provided besides a driver's seat, the dog clutch having a sleeve capable of effecting gearshifts in a prompt and facilitated manner, a forward gear and a reverse gear, characterized in that: the sleeve of the dog clutch is provided with means for simultaneously engaging the forward and reverse gears when the change device is set in a "parking" position.

Transmissions with an above-described parking mechanism according to the invention has the following advantages.

(a) There can be obtained a parking mechanism which can securely lock the output shaft without requiring a gear, a lock pole or other additional components exclusively for parking.

(b) It becomes possible to provide a parking mechanism in the conventional manual transmissions at a low cost by making slight alterations in design, without inviting problems such as complication in construction and increase in weight and size.

The above and other objects, features and advantages of the invention will become apparent from the following description and appended claims, taken in conjunction with the accompanying drawings which show by way of example preferred embodiments of the invention.

DESCRIPTION OF PREFERRED EMBODIMENTS

Referring to FIGS. 4 to 9, there is shown a transmission incorporating a parking mechanism embodying the present invention, in which indicated at 1 is a select mechanism, at 2 a shifter mechanism, at 3 a select mechanism return assembly, at 4 a select and shifter shaft, at 5 a double engaging means fixedly mounted on the select and shifter shaft, and at 6 a shifter arm engageable with the double engaging means.

Figure 4:
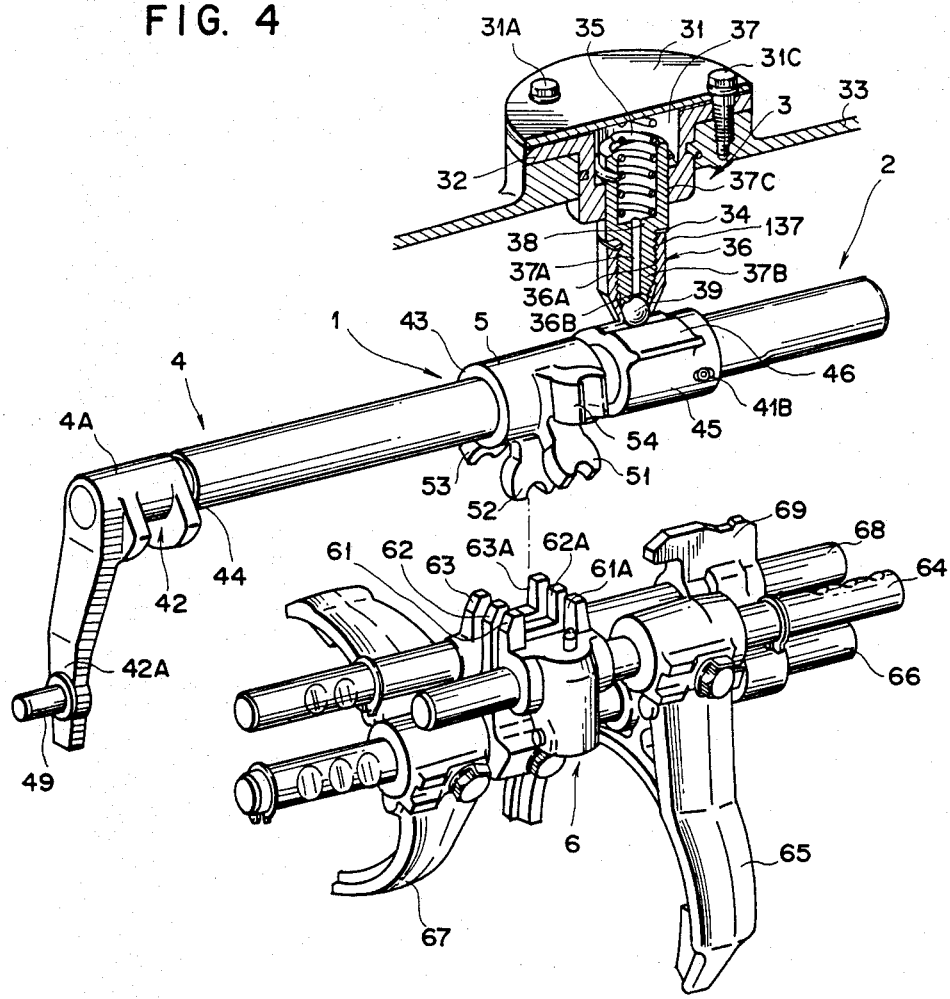
FIG. 4 is a schematic section of shift and select mechanisms in a parking mechanism of a transmission, constituting a first embodiment of the invention.
Figure 5:
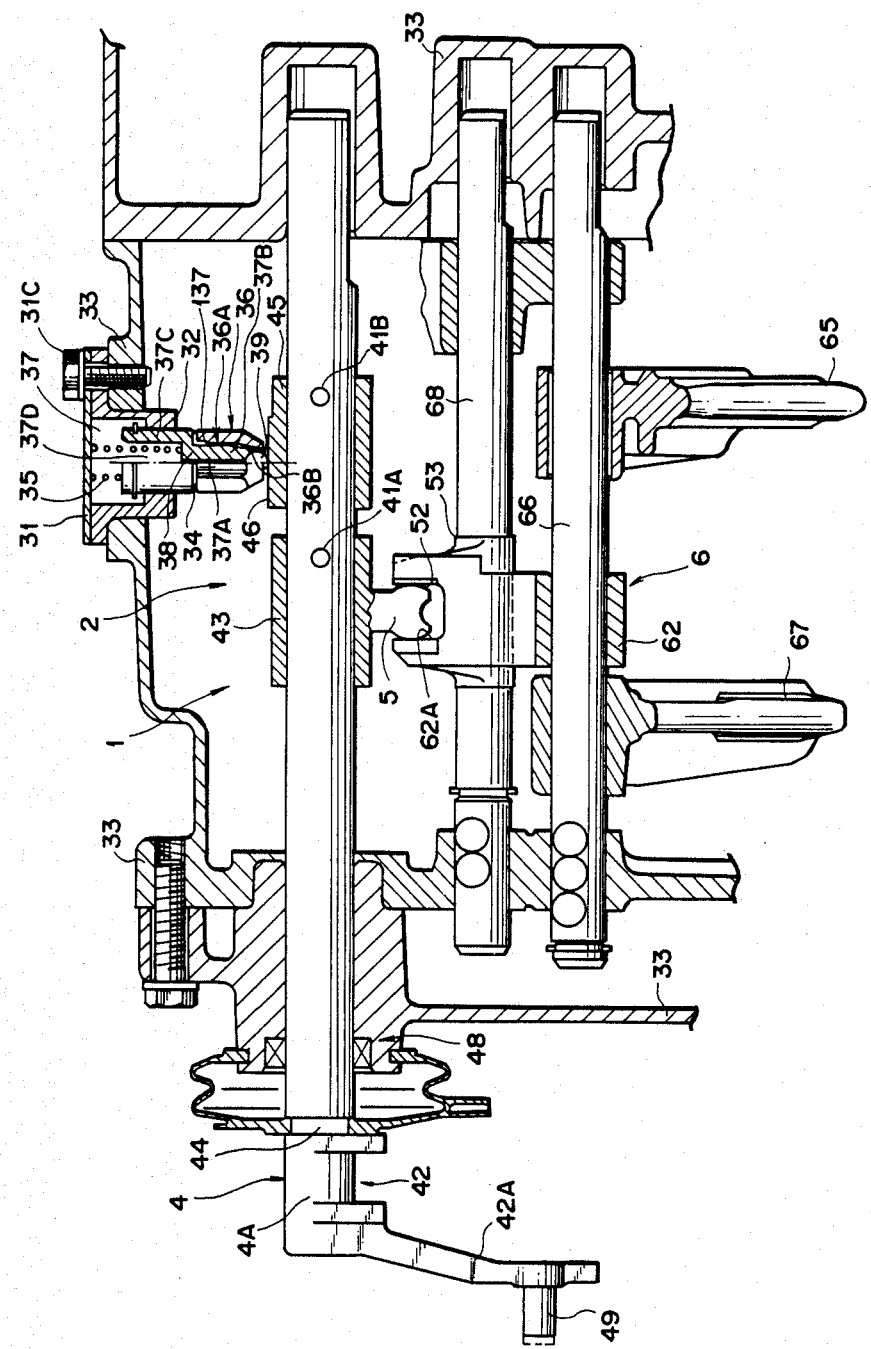
FIG. 5 is a schematic front view of the shift mechanism for the parking mechanism of the first embodiment.
Figure 6:
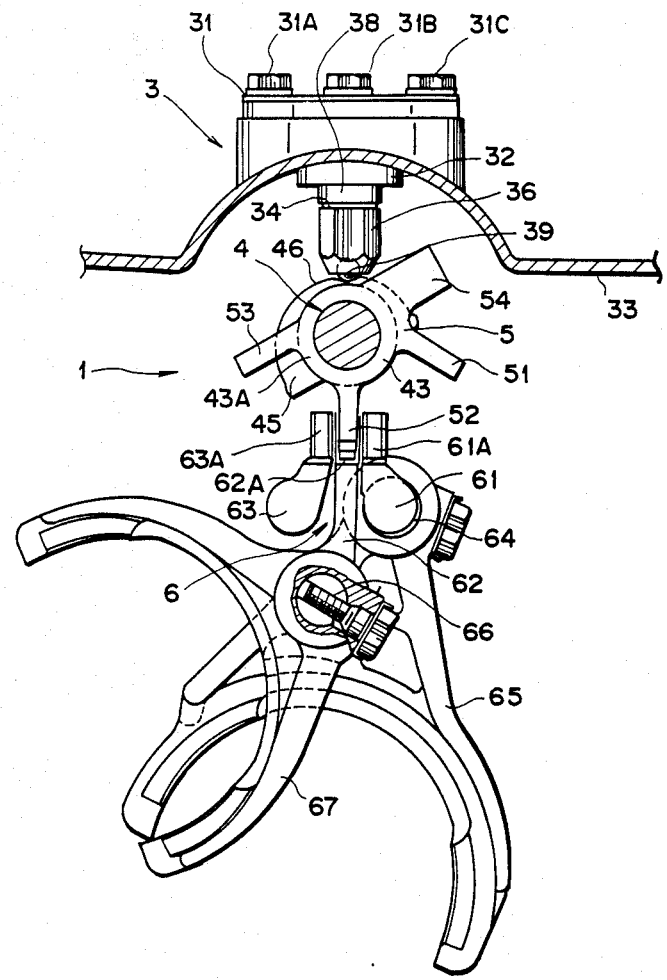
FIG. 6 is a schematic front view of the select mechanism in the parking mechanism of the first embodiment.
Figure 7:
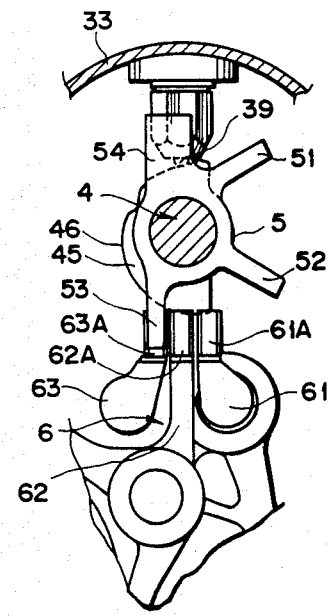
FIGS. 7 to 9 are front views of the select mechanism of the parking embodiment in the first embodiment.
Figure 8:
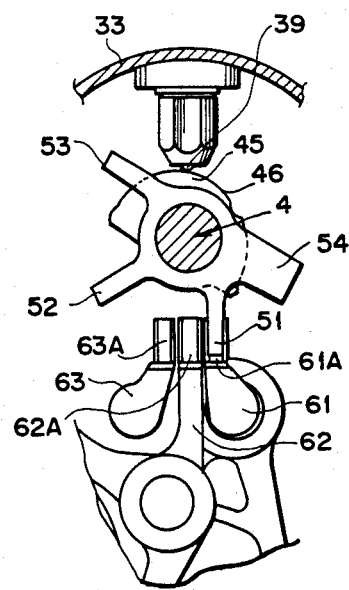

As shown particularly in FIGS. 4 to 6, the select mechanism return assembly 3 includes: an interlock plate 31; a support 32 mounted on a transmission case 33 along with the plate 31 by bolts 31A, 31B and 31C, and internally provided with an air chamber 37; a spring guide tube 38 located within the air chamber 37 and centrally provided with an air passage 37A and having a small diameter section 37B with a screw portion 137 on the outer periphery thereof and a large diameter section 37C with a spring receptacle bore 37D at the center thereof; and a compression spring 35 interposed between the guide tube 38 and the plate 31 for pressing a cam which will be described hereinlater. The return assembly further includes an annular wave washer 34 fitted on the small diameter section 37B of the guide tube 38 and a ball holder 36 having a screw portion 36A threaded on the screw portion 137 of the small diameter section 37B, holding a ball 39 within its tapered fore end portion 36B.

As shown particularly in FIGS. 4 and 5, the select and shifter shaft 4 is provided with a shifter cable connecting portion 42 at its left end 4A in the drawing, and fitted in the case 33 through an oil seal 48, with an annular dust cover abuttingly fitted on a small diameter portion 44. An annular guide portion 42A which is extended radially outward from the left end 4A of the select and shifter shaft 4 is linked to a select cable connecting portion 49. The select and shifter shaft 4 further includes a hollow connecting member 43 which is rotatable integrally with the select and shifter shaft 4 and fixed in position by a fixed spring pin 41A, and a hollow cam member 45 which is fixed on the select and shifter shaft 4 by a fixed spring pin 41B in a manner similar to the connecting member 43. Pressed against a cam surface 46 of the cam member 45 is the afore-mentioned ball 39 which is urged toward the cam surface 46 by the compression spring 35.

As illustrated particularly in FIGS. 4 and 6, the double engaging means 5 includes a first or second speed coupling member 51, a third or fourth speed coupling member 52 and a reverse coupling member 53, each in the form of a narrow pawl-like strip which is projected from the annular portion 43A of the connecting member 43 radially outward of the select and shifter shaft 4, and a broader parking coupling member 54 similarly projected from the annular portion 43A, for engagement respectively with shifter arms which will be described hereinafter.

The shifter arm 6 includes, as illustrated particularly in FIGS. 4 to 6, grooves 61A, 62A and 63A on the first/second speed shifter arm 61, third/fourth speed shifter arm 62 and reverse shifter arm 63, which are respectively engageable with the above-mentioned first-/second speed coupling member 51, third/fourth speed coupling member 52 and reverse coupling member 53. In the particular embodiment shown, the above-mentioned parking coupling member 54 engages in both the grooves 61A and 62A of the first/second speed shifter arm 61 and third/fourth speed shifter arm 62 to engage the two shifter arms simultaneously. The shifter arm 6 further includes: a first/second speed shifter rail 64 which is supported at the opposite ends by the case 33 in parallel relation with the select and shifter shaft 4 and which mounts thereon a first/second speed shifter fork 65 and a first/second shifter arm 61 for operating the first/second dog clutch 125; a third/fourth speed shifter rail 66 which mounts thereon a third/fourth speed shifter fork 67 and a third/fourth speed shifter arm 62 for operating the third/fourth speed dog clutch 117; and a reverse shifter rail 68 which mounts thereon a reverse shifter form 69 and a reverse shifter arm 63 for operating an idler gear (not shown) of the reverse gear mechanism 127.

The above-described parking mechanism of the transmission operates in the manner as follows.

Figure 1:
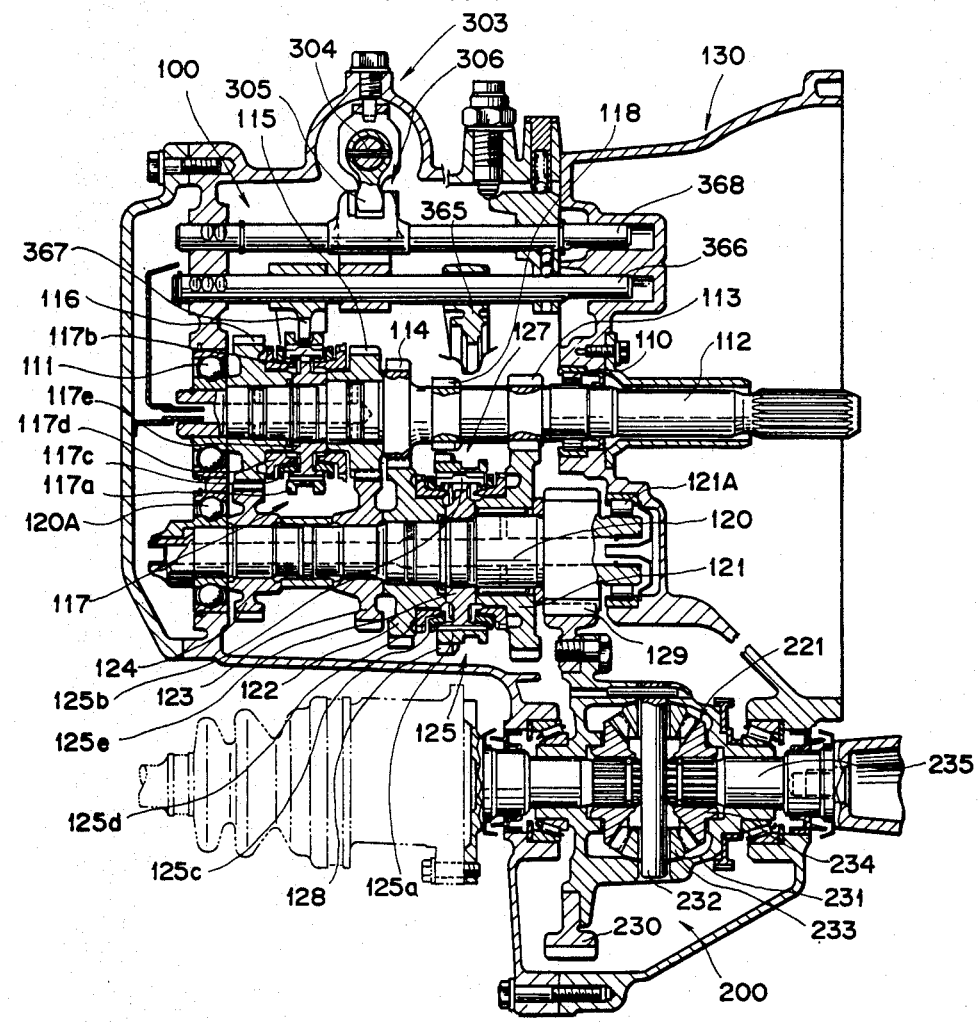
FIG. 1 is a schematic section of a transmission gear assembly.
Figure 2:
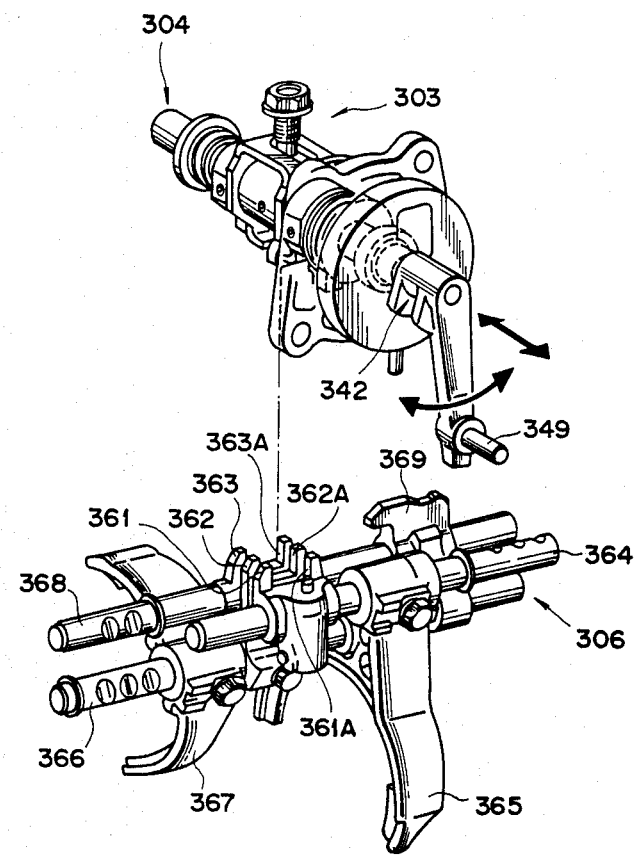
FIG. 2 is a schematic perspective view of a shift and select mechanism of the transmission.
Figure 3:
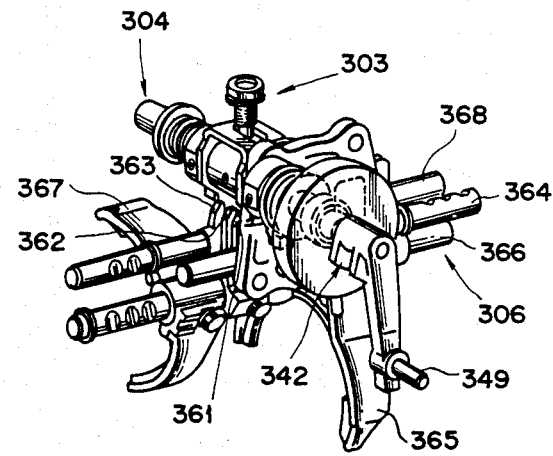
FIG. 3 is a schematic perspective view of a shift and select mechanism of the transmission.
Figure 9:
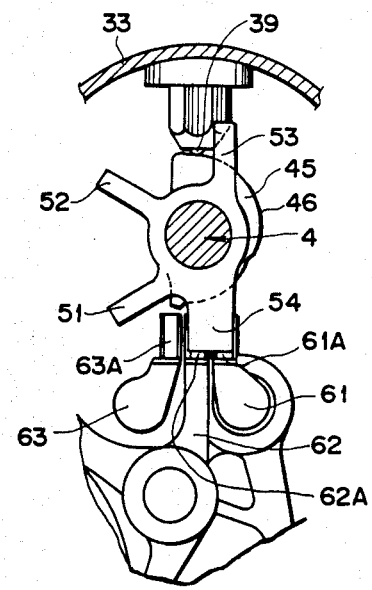

When the change unit in the passenger's room of the vehicle is in the neutral position, the select mechanism is held in the state shown in FIG. 5 by the moment which is produced by a variation in the pressing load of the cam 45 and a variation of the abutting surface of the cam surface 46 in engagement with the ball 39. In order to change gears from the neutral to the first speed position, the change unit is moved to the left. Whereupon, the connecting member 43 which is fixed to the select and shifter shaft 4 by the fixed spring pin 41A in FIG. 5 and the first/second speed coupling member 51 which is projected from the connecting member 43 are turned clockwise simultaneously with the clockwise rotation of the select and shifter shaft 4, bringing the first-/second speed coupling member 51 into engagement with the groove 61A of the first/second shifter arm 61 which is fixedly mounted on the first/second shifter rail 64. Upon shifting the change unit into the first speed position, the first/second speed coupling member 51 is moved to the right as shown in FIG. 5 in contact with the right-hand side wall of the groove 61A of the first-/second speed shifter arm 61 (not shown), stroking the shifter arm 61 to the right. Since the first/second speed shifter form 65 is in engagement with the groove on the outer periphery of the sleeve portion of the first/second speed dog clutch 125 in FIG. 1, the sleeve portion is stroked to the right to mesh the spline on the inner periphery of the sleeve portion with the spline on the first speed driven gear 121, thus establishing the first speed position. The second and higher forward speed positions and the reverse position (FIG. 7) are established in a similar manner (except for the stroking and rotational directions). As seen in FIG. 9, the narrow coupling members, namely, the first/second speed coupling member 51, the third/fourth speed coupling member 52 and the reverse coupling member 53 are fit respectively in the groove 61A of the first or second speed, groove 62A of the third or fourth speed or groove 63A of the reverse position to engage one corresponding shifter arm alone. The remaining parking coupling member 54 of a greater width is fit in both of the grooves 61A and 62A of the first/second speed shifter arm 61 and the third/fourth speed shifter arm 62 to stroke simultaneously the shifter arm grooves 61A and 62A, concurrently engaging the first and third speed gears or second and fourth speed gears to lock the output shaft 120 of the transmission.

The transmission with the above-described parking mechanism, employing a broad parking coupling member 54 for the simultaneous engaging means 5, is exempted from complication in construction and permits a reduction in the manufacturing cost.

Figure 10:
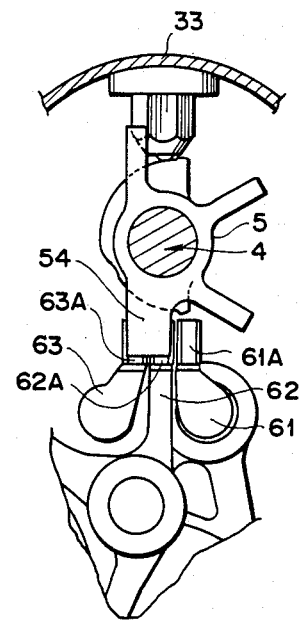
FIG. 10 is a schematic front view of a select mechanism of a parking mechanism of a transmission, constituting a second embodiment of the invention.
Figure 11:
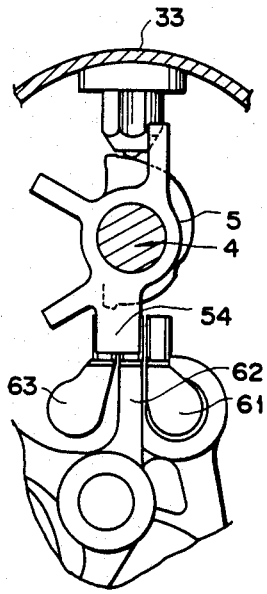
FIG. 11 is a schematic front view of a select mechanism of a parking mechanism of a transmission, constituting a third embodiment of the invention.
Figure 12:
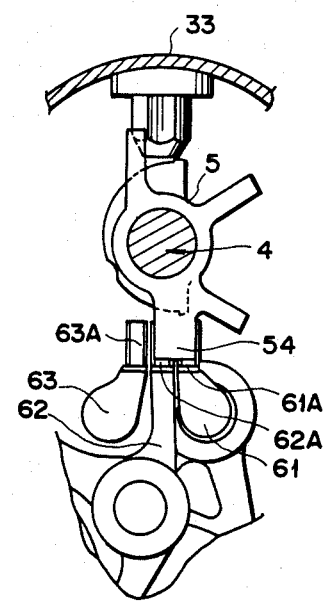
FIG. 12 is a schematic front view of a select mechanism of a parking mechanism of a transmission, constituting a fourth embodiment of the invention.

Shown in FIGS. 10 to 12 are the second, third and fourth preferred embodiments of the invention, in which indicated at 53 is a reverse coupling member, at 63 a reverse shifter arm, and at 63A a groove.

In the embodiment of FIG. 10, the coupling members of FIG. 9 are fixed to the select and shifter arm 4 in a reversed state, and the parking coupling member 54 is engageable simultaneously with grooves 62A and 63A on the reverse shifter arm 63 and the third or fourth shifter arm 62.

In the embodiment of FIG. 11, the parking coupling member 54 of FIG. 9 is engageable simultaneously with grooves 62A and 63A on the reverse shifter arm 62 and the third or fourth speed shifter arm 63.

In the embodiment of FIG. 12, the simultaneous engaging means of FIG. 11 is mounted on the select and shifter shaft 4 in a reversed state, and the coupling member 54 for parking is engageable simultaneously with the first or second speed shifter arm 61 and the third or fourth speed shifter arm.

Figures 13, 14:
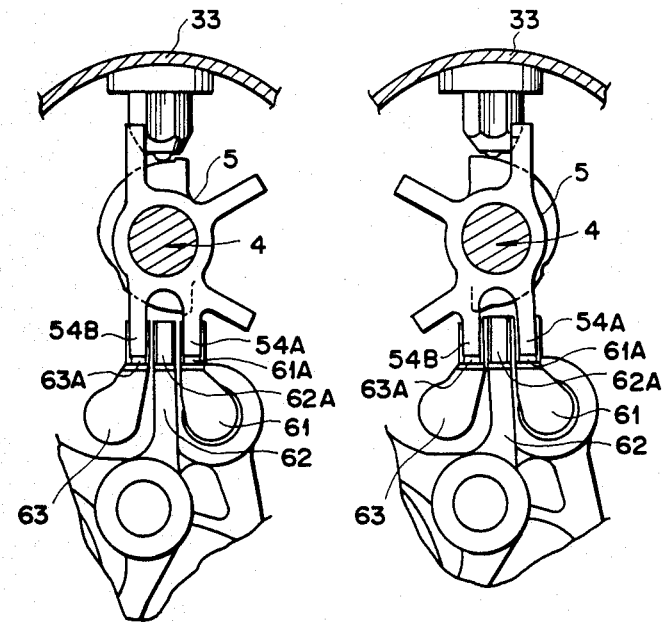
FIG. 13 is a schematic front view of a select mechanism of a parking mechanism of a transmission, constituting a fifth embodiment of the invention.
FIG. 14 is a schematic front view of a select mechanism of a parking mechanism of a transmission, constituting a sixth embodiment of the invention.

Referring to FIGS. 13 and 14, there are shown the fifth and sixth embodiments of the invention, which are provided with a reverse coupling member 53, a reverse shifter arm 63 and its groove 63A, and in which the parking coupling member 54 is constituted by a couple of pawl-like coupling members 54A and 54B with the same width as the other coupling members 51 to 53 as shown particularly in FIG. 10. In this instance, the parking coupling members 54A and 54B are simultaneously engaged with the grooves 61A and 63A of the first/second speed shifter arm 61 and the reverse shifter arm 63, respectively.

In the embodiment of FIG. 14, the double coupling means 5 of FIG. 13 is fixedly mounted on the select and shifter shaft 4 in a reversed state, so that one parking coupling member 54A is engaged in the groove 61A on the first/second speed shifter arm 61 and the other parking coupling member 54A is engaged in the groove 63A on the reverse shifter arm 63.

Figure 15:
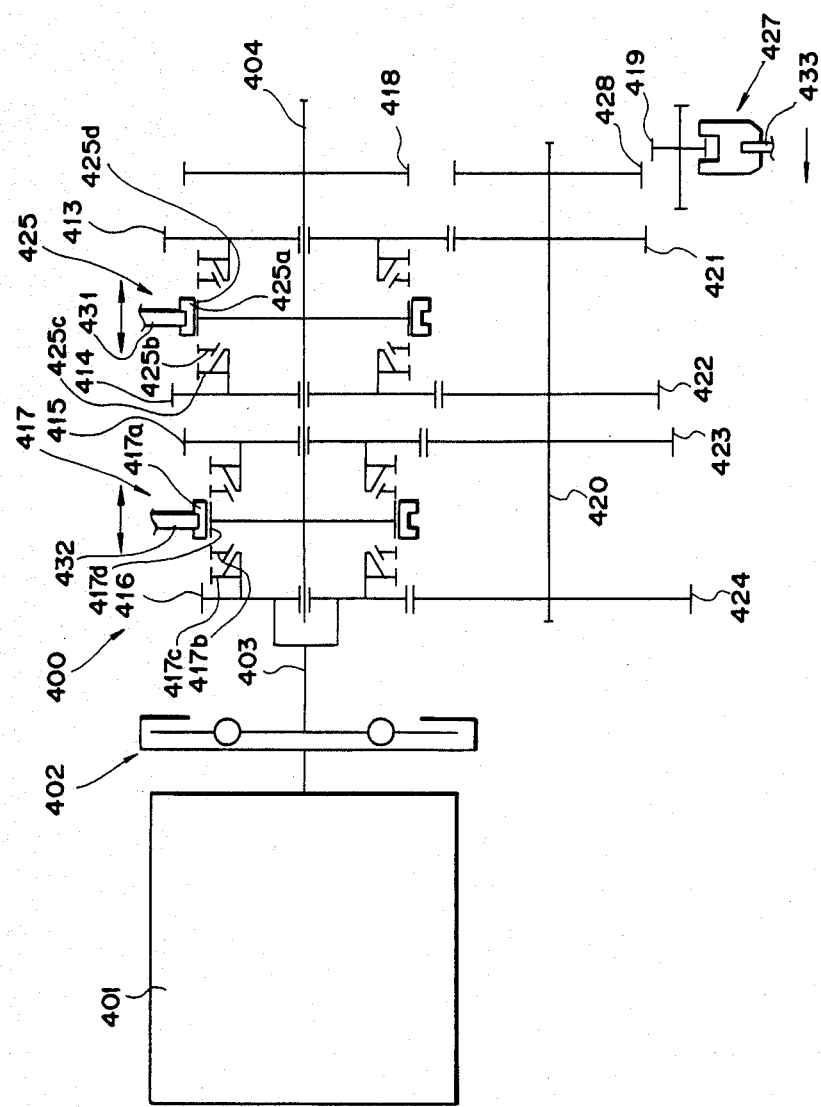
FIG. 15 is a skeletal view of a parking mechanism of a transmission, constituting a seventh embodiment of the invention.

FIG. 15 illustrates a seventh embodiment of the invention incorporating the parking mechanism into a transmission gear system which has its input and output shafts in coaxial positions and in which: indicated at 401 is an engine; at 402 a coupling mechanism; at 403 an output shaft of the coupling mechanism 402, serving also as an input shaft of a transmission gear system 400; at 404 an output shaft located coaxially with the input shaft 403; and at 420 a countershaft located parallel with the output shaft 404. Further, the transmission gear system 400 is provided with first, second, third and fourth speed driven gears 413 to 416 integrally on the output shaft 404, while first, second, third and fourth speed driven gears 421 to 424 which are constantly meshed respectively with the afore-mentioned driven gears 413 to 416 are rotatably fitted on the counter shaft 420 which is extended parallel with the output shaft 404. Two adjacent driven gears 413 and 414 are selectively coupled with the output shaft 404 by a first/second speed dog clutch 425 of a known construction including a sleeve 425a, a synchronizer ring 425b, a gear spline 425c and a clutch hub 425d. Similarly, the driven gears 415 and 416 are selectively coupled with the output shaft 404 by a third/fourth speed dog clutch 417 of a known construction including a sleeve 417a, a synchronizer ring 417b, a gear spline 417c and a clutch hub 417d. Further, there is provided a drive gear 428 which is engageable with the reverse driven gear 418 through the reverse idler gear 419. Consequently, if the first-/second speed dog clutch 425 is operated toward the driven gear 413 by a shift control mechanism to connect it to the output shaft 404, the rotation of the input shaft 403 is transmitted to the output shaft 404 after a maximum speed reduction through the gears 413 and 421 to establish the first speed. In a similar manner, the dog clutch 425 is moved toward the driven gear 414 to establish the second speed, and the dog clutch 417 is moved toward the driven gear 415 or 416 to establish the third or fourth speed. The reverse position is obtained by operation of the gear mechanism 427.

In this embodiment, the coupling member for parking is engaged simultaneously in the grooves of the first-/second speed shifter arm and the third/fourth speed shifter arm, moving the first/second speed dog clutch 425 and the third/second speed dog clutch 417 by stroking the first/second speed shifter fork 431 and the third-/fourth speed shifter fork 432 simultaneously in the axial direction as described hereinbefore in connection with the first embodiment, thereby locking the transmission gear system 400 for parking. A similar locking effect can be also obtained by simultaneously operating the reverse shifter fork 433.

Figure 16:
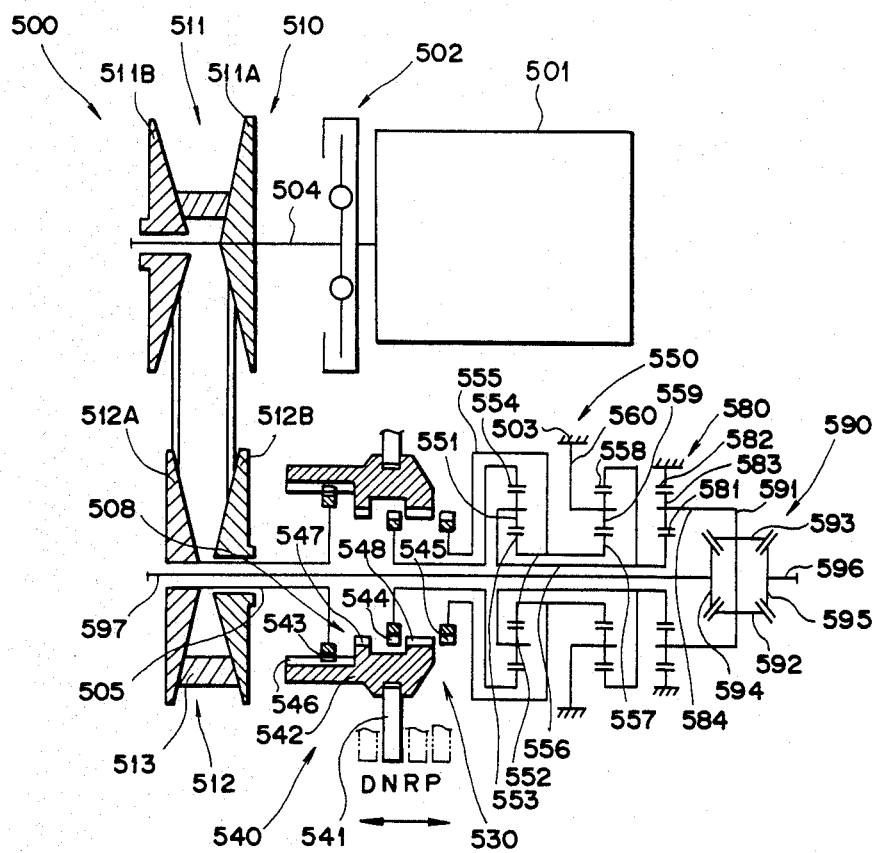
FIG. 16 is a skeletal view of a parking mechanism of a V-belt type stepless transmission, constituting an eighth embodiment of the invention.

FIG. 16 illustrates an eighth embodiment incorporating the parking mechanism of the invention into a V-belt type stepless transmission 500, including an engine 501, a power delivery unit 502, a V-belt type transmission mechanism 510, a forward/reverse selector (a parking mechanism) 530, and a differential mechanism 590.

The V-belt type transmission mechanism 510 includes: an input shaft 504 located coaxially and in series to the output shaft of the engine 501; an output shaft 505 of the V-belt transmission mechanism 510 located parallel with the input shaft 504; an input pulley 511 mounted on the input shaft 504 and having a fixed flange 511A and a movable flange 511; an output pulley 512 mounted on the output shaft 505 and having a fixed flange 512A and a movable flange 512B; a V-belt 513 turning around the input and output pulleys 511 and 512; and known subsidiary component parts.

The forward/reverse selector 530 is constituted by a dog clutch 540 and a forward/reverse switch planetary gear set 550.

The dog clutch 540 includes: a shift fork 541 linked to a selector (not shown); a forward/reverse switch sleeve 542 to be stroked in the axial direction by engagement with the shift fork 541; a gear 543 coupled with the fixed flange 512A of the output pulley 512; a forward gear 544; a reverse gear 545; and splines 546 to 548 to be meshed respectively with the just-mentioned gears.

The forward/reverse switch planetary gear set 550 includes: a first sun gear formed on a sun gear shaft 552; a second sun gear 557; a first ring gear 554 coupled with the forward gear 544 of the dog clutch 540; a connecting member 555 joining the reverse gear 545 of the dog clutch 540 with the sun gear shaft 552; a first carrier 556 connected to a sun gear 581 of a reducing planetary gear 583 and at the same time to the first planetary gear 551 and the second ring gear 558; and a second carrier 560 connecting the transmission case 503 to a second planetary gear 559.

The reducing planetary gear set 580 is constituted by a sun gear 581, a ring gear 582 connected to the transmission case 503, and a carrier 584 connecting a planetary gear 583 to a differential mechanism 590.

The differential mechanism 590 includes: an input shaft constituted by an output sleeve 591 connected to the carrier 584 of the reducing planetary gear set 580; small differential gears 592 and 593 integrally connected to the input shaft 591; large differential gears 594 and 595 meshed with the small differential gears 592 and 593; one output shaft 596 connected to the large differential gear 595; and the other output shaft 597 connected to the large differential gear 594 and extended through the output shaft 505 of the V-belt transmission 510, sung gears 553, 557 and 581 and output sleeve 591.

In this embodiment, the respective shift positions are established through the forward/reverse switching sleeve 542 as the shifter fork 541 is stroked in the acial directin by the selector. If the shift fork 541 is switched to the position "P", it causes the spline 547 to engage with the forward gear 545 and at the same time the spline 548 to engage with the reverse gear 545, constituting a double engaging means 508 which couples the forward/reverse switching planetary gear set 550 into one and same rotational system. When coupled, the planetary gear set 550 and the output shaft 505 is locked since the carrier 560 of the planetary gear set 550 is fixed to the case.

Figure 17:
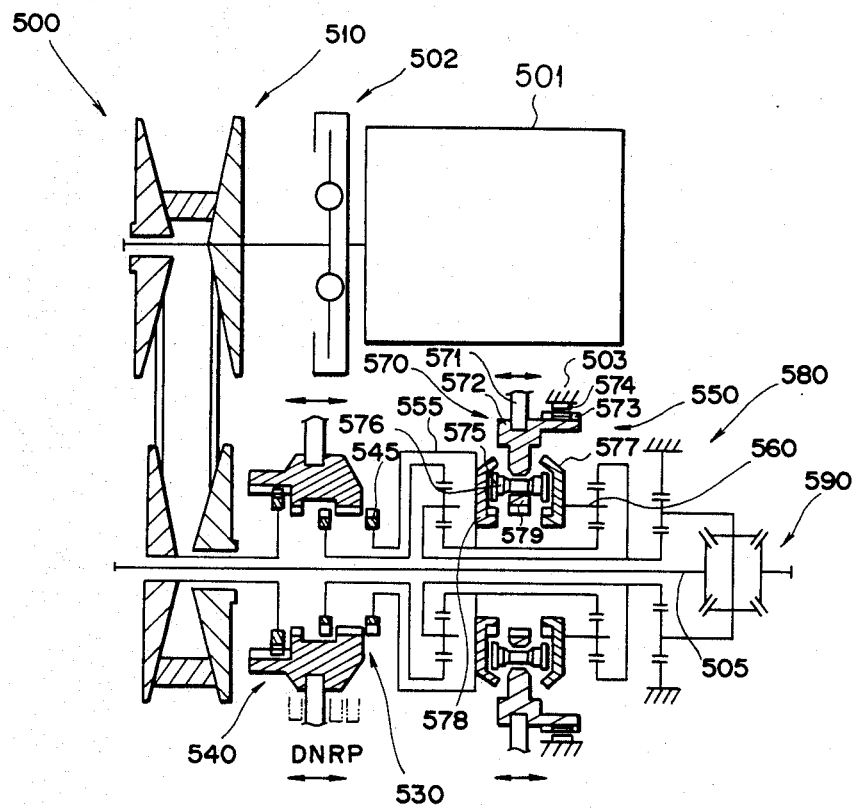
FIG. 17 is a skeletal view of a parking mechanism of a V-belt type stepless transmission, constituting a ninth embodiment of the invention.

FIG. 17 illustrates a ninth embodiment of the invention, incorporating the parking mechanism into a V-belt type step-less transmission 500 with a dog clutch 570 for high speed-low speed gearshift.

The high speed-low speed shift dog clutch 570 includes: a high speed-low speed shift sleeve 572 to be stroked in the axial direction by a shifter fork 571; a spline 574 formed on the transmission case 503 for engagement with a spline 573 on the sleeve 572; a guide pin 576 supporting a synchronizer ring 575; one synchronizing outer ring 577 connected to the carrier 560; the other synchronizing outer ring 578 connected to the reverse gear 545 through the connecting member 555; and a high speed-low speed clutch hub 579 engageable with the cynchronizing outer rings 577 and 578 during operation of the sleeve 572.

The operation is same as in the foregoing eighth embodiment.

What is claimed is:

1. A parking mechanism for a transmission, comprising:

an input shaft having a plurality of drive gears;

an output shaft located in parallel with said input shaft, and having a plurality of driven gears constantly meshed with corresponding gears of said drive gears;

a plurality of dog clutches selectively coupled between one of said drive gears and said input shaft or between one of said driven gears and said output shaft;

a plurality of parallel shifter rails disposed in parallel with said input shaft, each of said shifter rails including a shifter fork fixed thereon for axial movement with said shifter rail into engagement with one of said dog clutches, each of said shifter rails also having a single shifter arm mounted thereon, each of said shifter arms having a groove therein;

a select and shifter shaft disposed in parallel with said shifter rails, and an annular member fixed to said select and shifter shaft for movement therewith, said annular member having a plurality of coupling members, said coupling members being engaged in said grooves, by rotation of said select and shifter shaft, for axial movement of one of said shifter rails, and a parking coupling member for the parking position provided on the annular portion of said select and shifter shaft for engagement within the grooves of at least two of said shifter arms, by rotation of said select and shifter shaft, for axial movement of two shifter rails whereby the shifter fork on one of said two shifter rails is brought into operative engagement with a first of said dog clutches and the shift fork on the other of said two shifter rails is brought into operative engagement with a second of said dog clutches thereby establishing a parking position independent of other shift positions.

2. A parking mechanism for transmission, comprising:

an input shaft, an output shaft located in a coaxial relationship with said input shaft, and having a plurality of driven gears, a countershaft located in parallel with said input shaft, and having a plurality of drive gears constantly meshed with said driven gears;

a plurality of dog clutches selectively coupled between one of said driven gears and said output shaft, a plurality of parallel shifter rails disposed in parallel with said input shaft, each of said shifter rails having a shifter fork fixed thereon for axial movement with said shifter rail into engagement with one of said dog clutches, each of said shifter rails also having a shifter arm mounted thereon, each of said shifter arms having a groove therein;

a select and shifter shaft disposed in parallel with said shifter rails, and an annular member fixed to said select and shifter shaft for movement therewith, said annular member having a plurality of coupling members, said coupling members being engaged in said grooves, by rotation of said select and shifter shaft, for axial movement of one of said shifter rails, and a parking coupling member for the parking position provided on the annular portion of said select and shifter shaft for engagement within the grooves of at least two of said shifter arms, by rotation of said select and shifter shaft, for axial movement of two shifter rails whereby the shifter fork on one of said two shifter rails is brought into operative engagement with a first of said dog clutches and the shifter fork on the other of said two shifter rails is brought into operative engagement with a second of said dog clutches establishing a parking position independent of other shift positions.

3. A parking mechanism as set forth in claim 1, wherein said parking coupling member for the parking position is broader than the other coupling members.

4. A parking mechanism as set forth in claim 2, wherein said parking coupling member for the parking position is broader than the other coupling members.

5. A parking mechanism as set forth in claim 1, wherein said parking coupling member for the parking position comprises a pair of engaging portions.

6. A parking mechanism as set forth in claim 2, wherein said parking coupling member for the parking position comprises a pair of engaging portions.

7. A parking mechanism as set forth in claim 1 which further comprises a cam member unitarily mounted on said select and shifter shaft, and a select device adapted to press a cam surface of said cam member for allowing said select and shifter shaft to set a neutral position.

8. A parking mechanism as set forth in claim 2 which further comprises a cam member unitarily mounted on said select and shifter shaft, and a select device adapted to press a cam surface of said cam member for allowing said select and shifter shaft to set a neutral position.

* * * * *